3,343,909
RECOVERY OF VANADIUM AND PHOSPHORUS VALUES FROM FERROPHOSPHORUS
Keun Young Kim, St. Louis, Mo., assignor to Monsanto Company, a corporation of Delaware
No Drawing. Filed June 19, 1963, Ser. No. 288,875
16 Claims. (Cl. 23—22)

This invention relates to methods of recovering phosphorus values and more particularly to methods of recoverying phosphorus values from treated raw materials containing the same, an illustration of such material being the ferrophosphorus produced in some localities as a by-product of elemental phosphorus production.

Elemental phosphorus is commercially produced on a relatively large scale from phosphate rock in a number of western states, including the States of Idaho, Montana, Wyoming and Utah, and it is well known that the phosphate rock from such areas contains substantial quantities of metal values including vanadium, chromium and iron. In the electric furnace process for producing elemental phosphorus from this raw material metals of the above-type become concentrated in the ferrophosphorus by-product, and the ferrophosphorus usually contains from about 3 to 10% vanadium, 20 to 30% phosphorus, 3 to 6% chromium and 50 to 60% iron. The specific form of these constituents in ferrophosphorus is not known with certainity. Although there have been numerous efforts made to recover vanadium from ferrophosphorus, only one method to date appears somewhat commercially attractive in that the desired product containing vanadium can be produced in relatively pure form containing unobjectionable quantities of contaminants, such as, chromium, phosphorus, iron, and the like. This method, the so-called "salt roast" method, in general, comprises heating ferrophosphorus in the presence of oxygen and an alkali metal halide. The roasting operation, if properly conducted, results in a large percentage of the vanadium originally present in the raw material being transformed into compounds which are water-soluble and which can be extracted with an aqueous solvent. A primary advantage of this process is that the solubilization which is effected is selective and only a small percentage of the contaminants such as chromium, phosphorus, iron and the like present in the ferrophosphorus are solubilized. As can be appreciated, therefore, the vanadium can be recovered in not only acceptable yields but in acceptable purity. The salt-roast process is set out in greater detail in co-pending application Ser. No. 193,629, now U.S. Patent 3,259,455.

However, it can be appreciated that such a process could be materially enhanced commercially if a method could be found which permits the recovery of phosphorus values especially in view of the significant phosphorus content of the ferrophosphorus.

It is, therefore, a primary object of this invention to provide an economical process for recovering phosphorus values from treated raw materials containing the same and in particular from such raw materials as ferrophosphorus derived as a by-product of elemental phosphorus production.

It is another object of this invention to provide an economical process for recovering phosphorus values from a salt roasted ferrophosphorus.

It is a still further object of this invention to provide an economical process for recovering phosphate salts from a salt-roasted ferrophosphorus.

These, as well as other objects of this invention, are accomplished by a process which comprises contacting salt-roast ferrophosphorus with an alkaline decomposing agent, preferably under temperature conditions above room temperature, i.e., above 25° C., as will be more fully discussed hereinafter. When conducted under proper conditions, this results in the phosphorus being solubilized in the decomposing agent and it can readily be recovered therefrom.

All of the chemical reactions that occur in the salt-roast process are not fully understood nor is it fully understood just why an alkali metal halide facilitates the oxidation of the elemental vanadium and/or vanadium compounds in ferrophosphorus so that they are transformed into water-soluble compounds. In theory, it can be proposed that the salt-roast process entails an oxidation reaction and a salt reaction which can be represented as follows:

Oxidation:

(1) $2V + 2Cr + 2P + 2Fe + 8O_2 \rightarrow$ 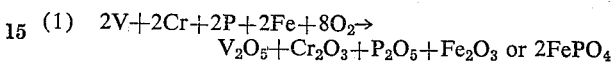
$V_2O_5 + Cr_2O_3 + P_2O_5 + Fe_2O_3$ or $2FePO_4$ Salt reaction:

(2) $V_2O_5 + 2NaCl + H_2O \rightarrow 2NaVO_3 + 2HCl\uparrow$
(3) $2FePO_4 + 2NaCl + H_2O \rightarrow 2NaPO_3 + Fe_2O + 2HCl\uparrow$ 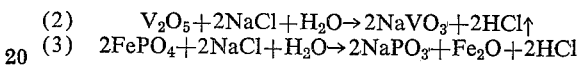

It is, therefore, useful to consider the salt-roast ferrophosphorus material suitable for use in practicing the present invention to be based upon percent oxidation and percent alkali metal present. Percent oxidation can be readily determined by the amount of oxygen pickup of the ferrophosphorus raw material during the salt-roast process with 100% oxidation considered to be the oxygen pickup equivalent to the reaction shown by Equation 1, i.e., formation of $V_2O_5$, $P_2O_5$, $Cr_2O_3$ and $Fe_2O_3$ from V, Cr, P and Fe present in the ferrophosphorus. Percent alkali metal present can readily be determined on a salt-roast ferrophosphorus material by elemental analysis. It should be noted that although the salt reaction is represented as forming HCl gas there is in most cases a minor amount, i.e., less than about 10% by weight of chloride present in the salt-roast ferrophosphorus.

In general, any ferrophosphorus raw material which has been salt-roasted is suitable for use in practicing this invention, however, salt-roast ferrophosphor characterized as being over about 40% oxidized and containing over about 5% alkali metal is usually preferred with salt-roast ferrophosphorus characterized as being over 75% oxidized and containing over about 10% alkali metal is especially preferred.

It should be noted, however, that phosphorus values may be recovered from other salt-roast ferrophosphorus which contains little, if any, vanadium such as that produced as a by-product in elemental phosphorus production from phosphate rock mined in such areas as Tennessee and Florida and the foregoing characterization with respect to the preferred salt-roast ferrophosphorus for use in the instant invention is also applicable to such salt-roast ferrophosphorus in an analogous manner with the different constituents and/or different proportions of constituents of the ferrophosphorus are taken into account.

Generally speaking, any alkaline solution, that is to say, any aqueous solution having a pH greater than about 7.5 may be used as the decomposing agent in practicing the present invention. It has been found that the more alkaline solutions function better as decomposing agents in both the rate of decomposition and the extent of decomposition. Therefore, the preferred decomposing agents are strongly alkaline solutions, i.e., aqueous solutions having a pH greater than about 11, and especially preferred are those having a pH of 12 or more. The pH of the aqueous solutions herein are the pH of the solutions at about 25° C.

In general, any water-soluble inorganic base can be used to form the alkaline solutions. Typical of the inorganic bases are the water-soluble alkali metal (Li, Na, K, Rb, Cs and Fr) oxides, hydroxide, phosphates and carbonates, alkaline earth metal (Ca, Mg, Sr and Ba) oxides, hydroxides and carbonates, ammonia and ammonia carbonate. However, since the alkaline earth metal bases tend to form water insoluble alkaline earth metal phosphate salts which would require further separation from the insoluble ferrophosphorus residue, bases which provide a cation which does not form a water-insoluble salt are preferred, such as the alkali metal bases and ammonium bases and because of the relatively inexpensiveness and ready availability as well as their added ability to form strongly alkaline solutions, NaOH and KOH are especially preferred.

In general, it is only necessary to contact the decomposing agent with the salt-roast ferrophosphorus in order to remove the phosphorus from the ferrophosphorus. In addition, the vanadium, if present, is also removed therefrom by such action. It is preferred, however, that the salt-roast ferrophosphorus and decomposing agent be heated in order to, inter alia, increase the rate of the solubilization. Although the ferrophosphorus and the decomposing agent may be heated at any temperature from about room temperature, i.e., about 25° C., to the boiling temperature of the decomposing agent, it is preferred that the mixture be heated at the boiling temperature or as close to the boiling temperature as practical. As an example, for a NaOH and/or $Na_2CO_3$ solution of between about 1% and 15% (by weight) temperatures between about 85 and 115° C. are usually most satisfactory. It should be noted that such heating may be conducted under pressure in order to permit, if desired, the use of higher temperatures.

The amount of the decomposing agent necessary to adequately solubilize the phosphorus and vanadium values depends, inter alia, on the concentration of the decomposing agent. In general, the decomposing agent should be as concentrated as practical since it is usually more convenient to recover soluble phosphorus and vanadium compounds from a relatively concentrated solution than from a dilute solution. Since the concentration of the decomposing agent should be preferably strongly alkaline, i.e., above a pH of about 11, any concentration above this pH value is preferred. When using an alkali metal hydroxide as the base, concentrations above about 1% by weight are especially preferred and as high as 10-15% have been found to be extremely well suited for use as the decomposing agent.

The amount of base needed to form the decomposing agent in the desired concentration can readily be determined by the amount of phosphorus in the salt-roast ferrophosphorus and the form of phosphorus which is to be recovered. Since the vanadium, when present, is solubilized by the salt-roasting operation it is usually not necessary to consider it in determining the amount of base needed and the concentration of the decomposing agent. In addition, it should also be noted that since an alkali metal halide is used in the roasting operation and the salt-roast ferrophosphorus thereby contains alkali metal, it is advantageous, therefore, to take this into account and use as the decomposing agent an alkali metal base solution, thus enabling the use of lesser amounts of the alkali metal base to form the decomposing agent to produce the desired form of phosphorus which is to be recovered. It should be noted, however, that usually amounts of alkali metal present in the salt-roast ferrophosphorus which give an Na/P molar ratio of no greater than about 1 can be considered as being available for use in solubilizing the phosphorus values. Here, though, the amount of alkali metal present in the salt-roast ferrophosphorus should first be considered as forming the alkali metal matavanadate ($M \cdot VO_3$) when vanadium is present with the remaining alkali metal then considered as discussed hereinabove.

As an example of the foregoing, for determining the amount of NaOH needed to form trisodium orthophosphate from an NaCl-roast ferrophosphorus containing vanadium values, the elemental analysis of the salt-roast ferrophosphorus can readily be obtained and from this the necessary calculations can be made to determine the desired amount of NaOH needed. Amounts of NaOH can be used which will furnish enough Na to add with the amount of available Na found in the salt-roast ferrophosphorus as discussed hereinabove to give a Na/V molar ratio of about 1 and a Na/P molar ratio of about 3. In addition, amounts in excess of the foregoing are preferably used with usually excess amounts of less than 20% by weight of Na being sufficient, and although larger excess amounts may be used there does not appear to be any particular advantage in so doing.

The foregoing is also applicable when KCl is used as the alkali metal halide in the salt roasting operation and KOH is used as the alkali metal base in the decomposing agent. In addition, although the formation of the trialkali metal orthophosphate is preferred, the foregoing is also applicable when forming other phosphate salts, such as, the dialkali metal salts of phosphorus, such as $Na_2HPO_4$ and $K_2HPO_4$, except that the Na/P molar ratio of about 2 should be used in the calculations.

The period of time of contact of the salt-roast ferrophosphorus and decomposing agent necessary to effect the maximum degree of solubilization of the phosphorus values in the salt-roast ferrophosphorus depends, inter alia, on the concentration and pH of the decomposing agent and amount of heat used, if any, and although some solubilization will take place immediately upon contact with the decomposing agent, it is preferable that the contact be maintained for a period of time which is sufficient to effect maximum solubilization and usually periods of time between about 30 minutes and 10 hours are sufficient.

When the foregoing mentioned process is conducted properly, the vanadium values, when present, and phosphorus values are solubilized selectively from the other values, that is to say, little if any of the other values, such as, chromium and iron, are solubilized. The phosphorus and vanadium can thereafter be separated by known procedures such as selective crystallization, solvent extraction, and the like. For example, separation by such means as disclosed in U.S. Patent 2,654,655 and U.S. Patent 3,083,085 which are directed, respectively, to the separation of vanadium values from phosphorus values by selective crystallization and solvent extraction methods.

Because the phosphorus and vanadium contained in the salt-roast ferrophosphorus are solubilized in practicing the instant invention as hereinabove described, a preferred method for recovering phosphorus values in relatively good yields and substantially pure form comprises selectively removing the vanadium and phosphorus values from the salt-roast ferrophosphorus rather than from an alkaline solution containing both values as hereinabove described. A primary advantage of the salt-roast process is that the vanadium present in the resulting salt-roast ferrophosphorus is solubilized in preference to the other materials contained in the ferrophosphorus. Advantage is taken of this and therefore the vanadium values are first separated from the salt-roast ferrophosphorus with an aqueous solvent having a pH of between about 6 to 7.5. For this leaching operation, there is preferably employed water in as pure a state as is conveniently available. A primary reason that the aqueous solvent should be substantially pure water is that any impurities in the aqueous solvent can contaminate the vanadium product and for most applications it is desirable to have vanadium compounds in as pure a state as possible. The amount of the aqueous solvent employed should be held to near the minimum necessary to adequately extract the vanadium values, believed to be extracted as the alkali metal metavanadate, from the roasted material. A primary reason for this is that by most procedures it is more convenient to recover soluble vanadium compounds from a relatively concentrated solution than from a dilute solution. However, to avoid possible undesirable precipitation in various stages of the process, the concentration of the alkali metal metavanadate in the aqueous extract is advantageously held at a level which will give a calculated $V_2O_5$ content not above about 7% by weight and preferably not above about 5% by weight. It will be apparent that there is no operative upper limit as to the amount of the aqueous solvent that can be employed since if the extract is too dilute to permit satisfactory recovery of the vanadium values it can be concentrated by evaporation of excess solvent. Preferably, however, an amount of the aqueous solvent is employed which will provide without concentration a solution containing at least about 2% and preferably at least about 4% of alkali metal metavanadate calculated as $V_2O_5$.

The temperature at which the aqueous extraction of the roasted mineral material is conducted and the manipulative procedure employed are relatively unimportant. It has been found that the rate of dissolution of the vanadium values from the roasted mineral material is relatively independent of the temperature of the aqueous solvent so that one can employ almost any temperature between the freezing and the boiling temperature of the solvent. Likewise, it is of little importance what type of extracting procedure is utilized and one can employ a slurrying and decantation technique, or, as another example, one can employ a counter current percolation technique. Percolation has been found to be quite satisfactory and is generally preferred.

The salt-roast ferrophosphorus from which the vanadium has been removed can thereafter be treated with the decomposing agent as hereinbefore described and the phosphorus values selectively removed from the ferrophosphorus. The phosphorus values can be utilized, if desired, in the alkaline solution or can be separated therefrom by such procedures as extraction and/or crystallization. When conducting the process to form the trisodium or tripotassium phosphate salt by using a decomposing agent containing an alkali metal base, such as, NaOH or KOH, under temperature conditions at or close to the boiling temperature of the decomposing agent, the trisodium or tripotassium phosphate salt can be readily crystallized by lowering the temperature of the decomposing agent to about room temperature. It should be noted that when the trisodium salt crystallizes from a strongly alkaline solution, it crystallizes as the $Na_3PO_4.12H_2O.1/4$ NaOH salt. However, these salts can be further purified by recrystallization from an aqueous medium. It should further be noted that it is also possible to form the disodium and dipotassium phosphate salts in the same manner as set-forth for the trisodium and tripotassium phosphate salts.

One embodiment of the invention will now be illustrated by the following example in which all parts and percentages are by weight unless otherwise specified.

*Example*

Into a suitable mixing vessel are charged about 1550 parts of water and about 100 parts of salt-roast ferrophosphorus of the following composition:

| Composition: | Percent by weight |
|---|---|
| P | 13.0 |
| V | 3.44 |
| Cr | 3.86 |
| Fe | 24.9 |
| Na | 15.3 |
| Cl | 2.8 |

The mixture is stirred for about 1 hour at room temperature and filtered in order to remove the vanadium values believed to be in the form $NaVO_3$. The residue of about 82 parts is of the following composition:

| Composition: | Percent by weight |
|---|---|
| P | 15.6 |
| V | .49 |
| Cr | 3.36 |
| Fe | 29.8 |
| Na | 11.2 |
| Cl | 0.03 |

The residue and about 250 parts of a 10% NaOH solution are charged to a mixing vessel and the mixture boiled at about 110° C. for about 1.5 hours and then filtered. The filtered residue of about 45.7 parts is of the following composition:

| Composition: | Percent by weight |
|---|---|
| Na | 2.25 |
| P | 0.765 |
| V | .234 |
| Cr | 6.00 |
| Fe | 52.6 |

The filtrate is cooled to room temperature, i.e., about 25° C., with about 150 parts of $Na_3PO_4.12H_2O.1/4$ NaOH crystallizing from the filtrate and this salt is removed by filtration.

Although the present invention has been described with a great deal of particularity and specificity and due to the fact that many modifications or variations are possible under the inventive concepts as outlined hereinabove, this invention is intended to be limited only by the claims appended hereto.

What is claimed is:

1. A method for separating phosphorus values from a salt-roast ferrophosphorus comprising contacting said ferrophosphorus with an aqueous inorganic alkaline solution having a pH greater than about 11 at a temperature of from about 25° C. to the boiling temperature of said alkaline solution and for a time sufficient to solubilize said phosphorus values therein and separating the alkaline solution containing said phosphorus values and the ferrophosphorus residue.

2. The method of claim 1 wherein said contacting is carried out between about 85° C. and the boiling temperature of said alkaline solution for a period of time between about ½ hour and about 10 hours.

3. A method of separating phosphorus values from a salt-roast ferrophosphorus characterized as being over about 40% oxidized and containing over about 5% by weight of alkali metal comprising contacting said ferrophosphorus with an aqueous alkaline solution having a pH greater than about 11 at a temperature of from about 85° C. and the boiling temperature of said alkaline solution, said aqueous alkaline solution comprising water and an inorganic base material selected from the group consisting of alkali metal oxides, alkali metal hydroxides, alkali metal carbonates, alkali metal phosphates, ammonia, and ammonia carbonate, whereby said phosphorus values are solubilized therein and separating the alkaline solution containing said phosphorus values and the ferrophosphorus residue.

4. A method for separating phosphorus values from a salt-roast ferrophosphorus characterized as being about 40% oxidized and containing over about 5% by weight of alkali metal comprising contacting said ferrophosphorus with an aqueous inorganic alkaline solution having a pH greater than about 11 with said contacting being carried out between about 85° C. and the boiling temperature of said alkaline solution for a period of time between about ½ hour and about 10 hours, whereby said phosphorus values are solubilized therein and separating the alkaline solution containing said phosphorus values and the ferrophosphorus residue.

5. The method of claim 5 wherein said alkaline solution is an aqueous sodium hydroxide solution.

6. The method for separating phosphorus values from a salt-roast ferrophosphorus containing vanadium values comprising contacting said ferrophosphorus with an aqueous inorganic alkaline solution having a pH greater than about 11 and a temperature of from about 25° C. to the boiling temperature of said alkaline solution whereby said phosphorus and vanadium values are solubilized therein and separating said phosphorus values and said vanadium values.

7. The method for separating phosphorus values from a salt-roast ferrophosphorus containing vanadium values and characterized as being over about 40% oxidized and containing over about 5% by weight of alkali metal comprising contacting said ferrophosphorus with an aqueous alkaline solution having a pH greater than about 11 at a temperature of from about 85° C. to the boiling temperature of said solution, said aqueous alkaline solution comprising water and inorganic base material selected from the group consisting of alkali metal oxides, alkali metal hydroxides, alkali metal phosphates, alkali metal carbonates, ammonia and ammonia carbonate, whereby said phosphorus values and said vanadium values are solubilized therein and separating said phosphorus values and said vanadium values.

8. The method for separating phosphorus values from a salt-roast ferrophosphorus containing vanadium values and characterized as being over about 40% oxidized and containing over about 5% by weight of alkali metal comprising contacting said ferrophosphorus with an aqueous inorganic alkaline solution having a pH greater than about 11 with said contacting being carried out between about 85° C. and the boiling temperature of said solution for a period of time between about ½ hour and about 10 hours whereby said phosphorus values and said vanadium values are solubilized therein and separating said phosphorus values and said vanadium values.

9. The method of claim 8 wherein said alkaline solution is an aqueous sodium hydroxide solution.

10. A method for separating phosphorus values from a salt-roast ferrophosphorus containing vanadium values comprising contacting said ferrophosphorus with water having a pH between about 6 and 7.5 whereby said vanadium values are solubilized therein, separating the water and the ferrophosphorus residue, contacting said ferrophosphorus residue with an aqueous inorganic alkaline solution having a pH greater than 7.5 at a temperature of from about 25° C. and the boiling temperature of said solution, whereby said phosphorus values are solubilized therein and separating the aqueous alkaline solution containing said phosphorus values and the ferrophosphorus residue.

11. A method of claim 10 wherein said alkaline solution has a pH greater than about 11.

12. A method of claim 10 wherein said alkaline solution has a pH greater than about 11 and said contacting is carried out between about 85° C. and the boiling temperature of said solution for a period of time between about ½ hour and about 10 hours.

13. A method for separating phosphorus from a salt-roast ferrophosphorus containing vanadium values and characterized as being over about 40% oxidized and containing over about 5% by weight of alkali metal comprising contacting said ferrophosphorus with water having a pH between about 6 and 7.5 whereby said vanadium values are solubilized therein, separating the water and the ferrophosphorus residue, contacting said ferrophosphorus residue with an aqueous alkaline solution having a pH greater than about 11 at a temperature of from about 25° C. to the boiling temperature of said aqueous alkaline solution, said aqueous alkaline solution comprising water and an inorganic base material selected from the group consisting of alkali metal oxides, alkali metal hydroxides, alkali metal phosphates, alkali metal carbonates, ammonia and ammonia carbonate, whereby said phosphorus values are solubilized therein and separating the aqueous alkaline solution containing said phosphorus values and the ferrophosphorus residue.

14. A method for separating phosphorus values from a salt-roast ferrophosphorus containing vanadium values and characterized as being over about 40% oxidized and containing over about 5% by weight of alkali metal comprising contacting said ferrophosphorus with water having a pH between about 6 and 7.5 whereby said vanadium values are solubilized therein, separating the water and the ferrophosphorus residue, and contacting said ferrophosphorus residue with an aqueous inorganic alkaline solution having a pH greater than about 11 with said contacting being carried out between about 85° C. and the boiling temperature of said solution for a period of time between about ½ hour and about 10 hours whereby said phosphorus values are solubilized therein and separating the aqueous alkaline solution containing said phosphorus values and the ferrophosphorus residue.

15. The method of claim 14 wherein said alkaline solution is an aqueous sodium hydroxide solution.

16. A method for separating phosphorus values from a salt-roast ferrophosphorus containing vanadium values and characterized as being over about 40% oxidized and containing over about 5% by weight of alkali metal comprising contacting said ferrophosphorus with water having a pH between about 6 and 7.5 whereby said vanadium values are solubilized therein, separating the water and the ferrophosphorus residue, and contacting said ferrophosphorus residue with an aqueous sodium hydroxide solution having a pH greater than about 11 with said contacting being carried out between about 85° C. and the boiling temperature of said solution for a period of time between about ½ hour and about 10 hours whereby said phosphorus values are solubilized therein, and recovering from said solution trisodium orthophosphate dodecahydrate one-quarter sodium hydroxide.

References Cited

UNITED STATES PATENTS 3,220,795   11/1965   Peterson et al. _____ 23—107

FOREIGN PATENTS 3,259,455   7/1966   Koerner et al. _____ 23—15
451,981    8/1963   Great Britain.

OSCAR R. VERTIZ, Primary Examiner.

H. T. CARTER, Assistant Examiner.